(12) United States Patent
Wildey et al.

(10) Patent No.: US 9,321,304 B2
(45) Date of Patent: Apr. 26, 2016

(54) TRACTOR/TRAILER WHEEL COVER

(71) Applicant: Consolidated Metco, Inc., Vancouver, WA (US)

(72) Inventors: Graham Wildey, Vancoucer, WA (US); Michael Miga, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 115 days.

(21) Appl. No.: 14/335,046

(22) Filed: Jul. 18, 2014

(65) Prior Publication Data
US 2016/0016429 A1    Jan. 21, 2016

(51) Int. Cl.
*B60B 7/06* (2006.01)
*B60B 7/08* (2006.01)
*B60B 7/00* (2006.01)

(52) U.S. Cl.
CPC ............. *B60B 7/066* (2013.01); *B60B 7/0013* (2013.01); *B60B 7/08* (2013.01); *B60B 2900/1216* (2013.01); *B60B 2900/211* (2013.01)

(58) Field of Classification Search
CPC .......... B60B 7/08; B60B 7/061; B60B 7/066; B60B 7/0013; B60B 2900/211; B60B 2900/1216; B60B 7/00; B60B 7/06; B60B 7/068
USPC ................. 301/37.102, 37.101, 37.31, 37.34, 301/37.376
See application file for complete search history.

(56) References Cited

U.S. PATENT DOCUMENTS

| | | | | |
|---|---|---|---|---|
| 1,875,906 A * | 9/1932 | Zarobsky | ...................... | 292/302 |
| 2,031,355 A * | 2/1936 | Zerk | ........................ | 301/37.105 |
| 2,043,874 A * | 6/1936 | Zerk | .......................... | 301/37.29 |
| 2,108,145 A * | 2/1938 | Short | .......................... | 224/42.2 |
| 2,726,900 A * | 12/1955 | Stanetzki | .................... | 301/35.61 |
| 4,040,672 A * | 8/1977 | Imahashi | .................... | 301/108.3 |
| 4,043,685 A * | 8/1977 | Hyams | .......................... | 403/19 |
| 4,067,621 A * | 1/1978 | Reppert | ...................... | 301/108.3 |
| 4,229,047 A * | 10/1980 | Beisch | ........................ | 301/37.42 |
| 4,635,335 A * | 1/1987 | Brown et al. | .................... | 29/235 |
| RE32,903 E * | 4/1989 | Braungart | .................... | 301/37.21 |
| 5,152,584 A * | 10/1992 | Maxwell, Jr. | ............ | 301/37.107 |
| 5,234,260 A * | 8/1993 | Coombes et al. | .......... | 301/108.1 |
| 5,358,313 A * | 10/1994 | Polka | ........................ | 301/37.376 |
| 5,443,582 A * | 8/1995 | Ching | ........................ | 301/37.376 |
| 5,542,750 A * | 8/1996 | FitzGerald | ............... | 301/37.376 |
| 5,876,099 A * | 3/1999 | Irgens-Moller et al. | ... | 301/108.4 |
| 6,378,955 B1 * | 4/2002 | Adamson et al. | .......... | 301/108.4 |
| 6,517,167 B2 * | 2/2003 | Baker | ........................ | 301/37.25 |
| 6,575,537 B1 * | 6/2003 | Wang | ........................ | 301/37.23 |
| 6,595,596 B1 * | 7/2003 | Polka | ........................ | 301/37.102 |
| 6,663,188 B2 * | 12/2003 | Sumi et al. | ................ | 301/37.33 |
| 6,857,708 B2 * | 2/2005 | Hartl et al. | ............... | 301/37.102 |
| 6,860,568 B2 * | 3/2005 | Nunes | ........................ | 301/37.23 |
| 6,932,434 B2 * | 8/2005 | Wang | ........................ | 301/37.102 |
| 6,945,609 B2 * | 9/2005 | Barney | ........................ | 301/37.25 |
| 7,416,259 B2 * | 8/2008 | Dagh et al. | .............. | 301/37.376 |

(Continued)

*Primary Examiner* — Hau Phan
*Assistant Examiner* — Jacob Meyer
(74) *Attorney, Agent, or Firm* — Edward J. Brosius

(57) ABSTRACT

The present invention provides a wheel cover for use to cover the wheel of a tractor or trailer. The wheel cover includes an inner support section and an outer main section. The outer main section includes a wheel cover surface and an outer edge. Further, the wheel cover includes a ratchet assembly comprising a spring, a support block, an operating holder and an extension. When installed on a truck wheel, the ratchet extension engages an outer radial edge of the inner support section that is installed on a wheel hub.

9 Claims, 4 Drawing Sheets

(56) References Cited

U.S. PATENT DOCUMENTS

| | | | |
|---|---|---|---|
| 7,547,076 B2* | 6/2009 | Necaise | 301/37.371 |
| 7,661,766 B2* | 2/2010 | Davis et al. | 301/37.25 |
| 8,276,992 B2* | 10/2012 | Smith | 301/37.376 |
| 8,454,213 B2* | 6/2013 | Lin | 362/500 |
| 8,801,107 B2* | 8/2014 | Schmid et al. | 301/37.107 |
| 8,857,921 B2* | 10/2014 | Schmid et al. | 301/37.107 |
| 9,114,874 B1* | 8/2015 | Danto | |
| 9,199,508 B2* | 12/2015 | Kronemeyer et al. | |
| 2004/0075335 A1* | 4/2004 | Hartl et al. | 301/108.1 |
| 2005/0040696 A1* | 2/2005 | Chiu | 301/37.35 |
| 2005/0146204 A1* | 7/2005 | Kim | 301/37.25 |
| 2006/0192422 A1* | 8/2006 | Goodman et al. | 301/37.102 |
| 2010/0270853 A1* | 10/2010 | Smith | 301/37.26 |
| 2011/0089748 A1* | 4/2011 | Grill et al. | 301/37.102 |
| 2011/0116279 A1* | 5/2011 | Lin | 362/500 |
| 2012/0043803 A1* | 2/2012 | Grill et al. | 301/37.26 |
| 2012/0256473 A1* | 10/2012 | Schmid et al. | 301/37.102 |
| 2013/0015698 A1* | 1/2013 | Butler et al. | 301/37.29 |
| 2013/0076107 A1* | 3/2013 | Starnes et al. | 301/37.102 |
| 2013/0313889 A1* | 11/2013 | Schmid et al. | 301/37.107 |
| 2013/0334869 A1* | 12/2013 | Kronemeyer et al. | 301/37.102 |
| 2014/0265533 A1* | 9/2014 | Polka | 301/37.102 |
| 2014/0284994 A1* | 9/2014 | Polka | 301/37.102 |
| 2014/0346844 A1* | 11/2014 | Wildey et al. | 301/37.28 |
| 2015/0210110 A1* | 7/2015 | Rose et al. | |

* cited by examiner

TRACTOR/TRAILER WHEEL COVER

BACKGROUND OF THE INVENTION

The present invention relates to a wheel cover for use with a heavy truck and trailer wheel, and in particular, a plastic wheel cover to be mounted on the hub of a heavy truck or trailer wheel.

Such wheel covers are useful in protecting the wheel hub from dirt and debris and hence damage, and also improve the aerodynamic characteristics of the truck.

SUMMARY OF THE INVENTION

The wheel cover of the present invention is for use with heavy trucks and trailers, and is mounted on the wheel hub of such a heavy truck or trailer. The wheel cover is usually comprised of a structural plastic.

The wheel cover includes a ratcheting assembly with an opposing latch which feature contributes to the ease with which the wheel cover can be affixed to the wheel hub.

DETAILED DESCRIPTION

Figure 1:
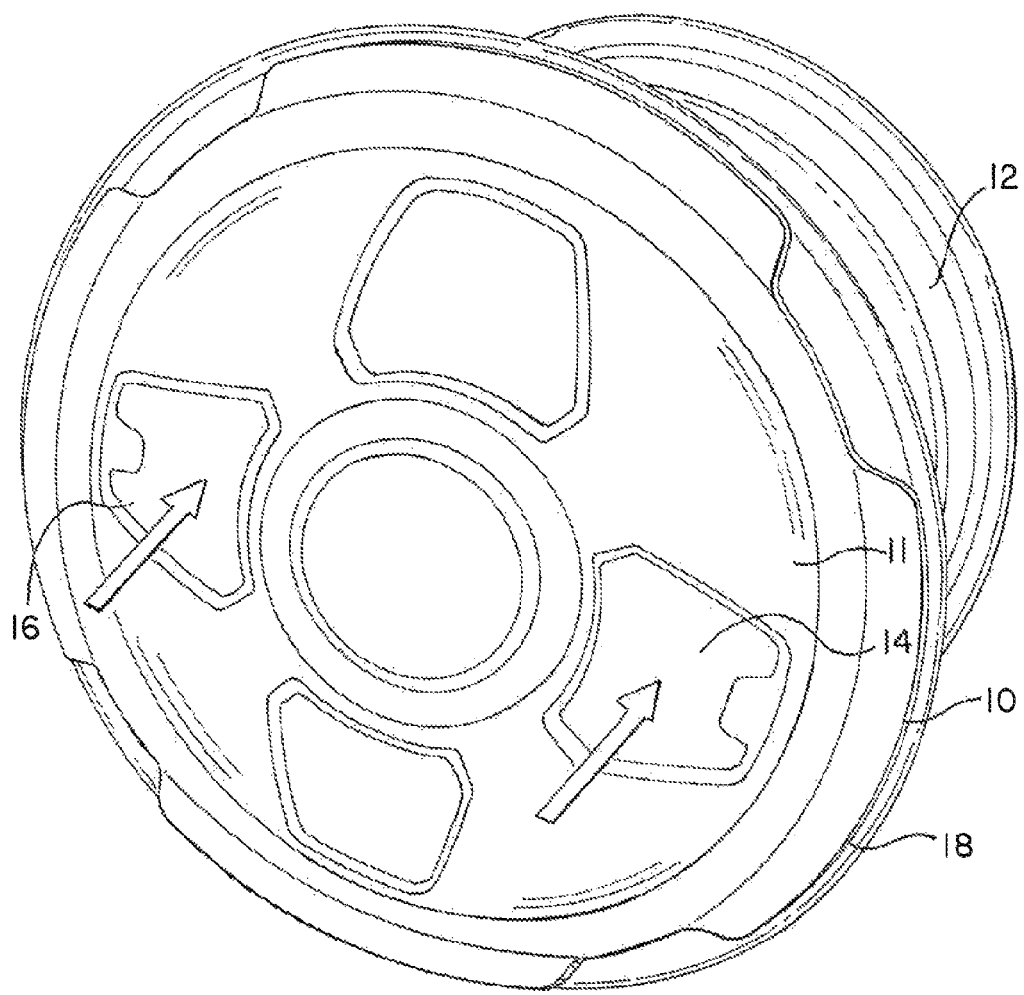
FIG. 1 is a perspective view of a wheel cover mounted on a wheel in accordance with a preferred embodiment of the present invention affixed to a truck or trailer wheel.

Referring now to FIG. 1, a wheel cover in accordance with an embodiment of the present invention is shown at 10. Wheel cover 10 is usually comprised of a structural plastic material, such as impact resistant exterior grade thermoplastic olefin, and is a generally circular shaped device having an outer edge 18. Wheel cover 10 is mounted to wheel 12, which is usually a heavy truck or trailer wheel which includes a centrally located wheel hub. Wheel cover 10 includes latch elements 14 and 16, which are located radially outward from the center of wheel cover 10 but radially inward from wheel cover edge 18.

Figure 2:
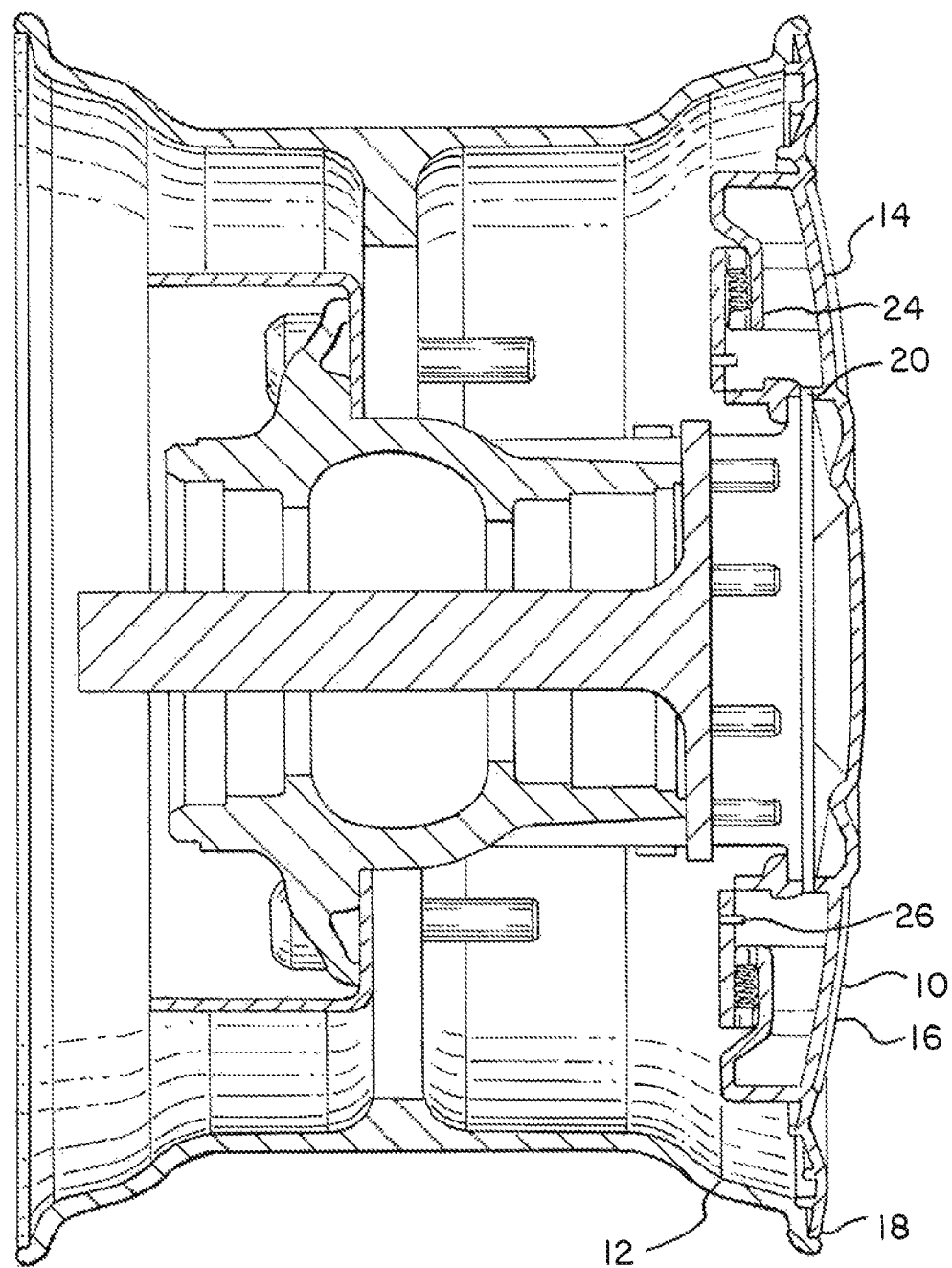
FIG. 2 is a cross section view of a wheel cover mounted on a wheel in accordance with a preferred embodiment of the present invention.

Referring now to FIG. 2, a cross section view of a wheel cover in accordance with an embodiment of the present invention is shown.

Wheel cover 10 is seen as a circular device, with an outer surface 11 and circular edge 18. Wheel cover 10 also includes latch element 14 with ratchet assembly 24, and latch element 16 with ratchet assembly 26.

Wheel 12 includes a radially centrally located hub 20. Wheel cover latch assemblies 24 and 26 are used to connect wheel cover 10 to wheel hub 20.

Figure 3:
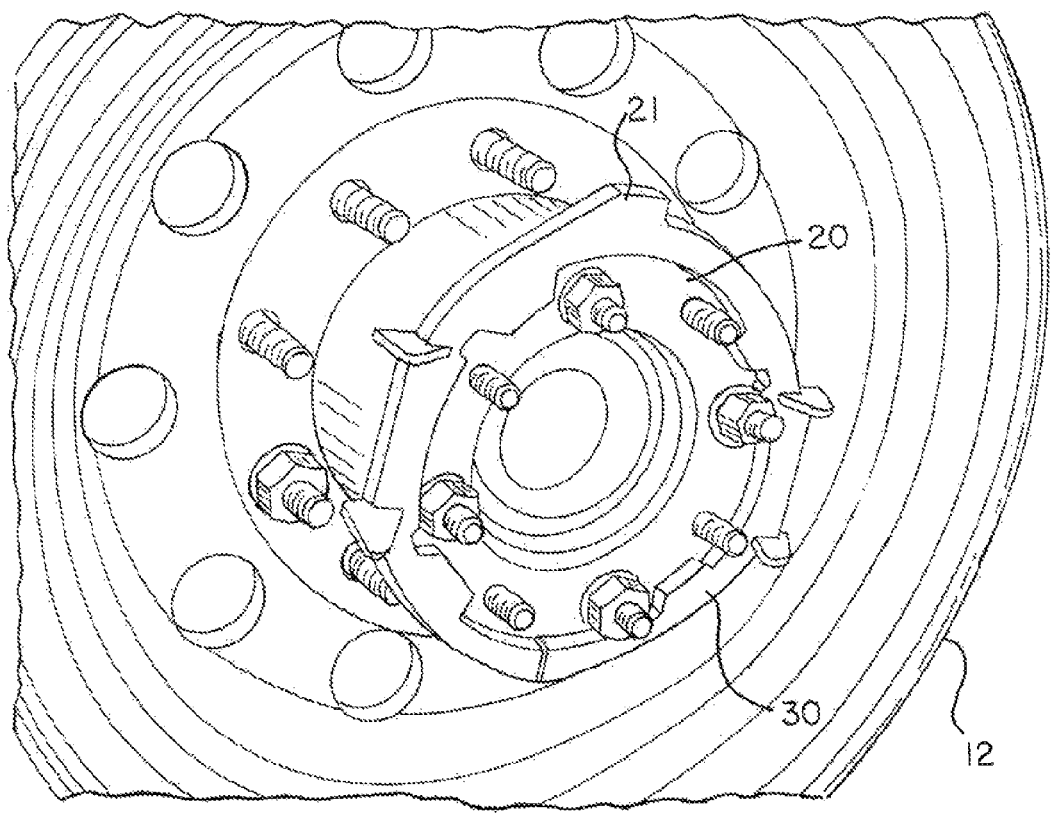
FIG. 3 is a perspective view of a support portion of a wheel cover mounted on a wheel hub in accordance with a preferred embodiment of the present invention.

Referring now to FIG. 3, a detailed perspective view of a portion of wheel 12 is shown, with radially centrally located wheel hub 20. Further, support collar 30 of wheel cover 10 is seen to be affixed to wheel hub 20. Support collar 30 of wheel cover 10 is seen to be a circular device that is affixed to an outer radial edge of wheel hub 20 near an outer lateral edge of wheel hub 20. Support collar 30 is usually affixed to wheel hub 20 by a clamp and pivot arrangement 21. Support collar 30 of wheel cover 10 is usually comprised of a structural plastic material such as an engineered thermoplastic polyamid.

Figure 4A:
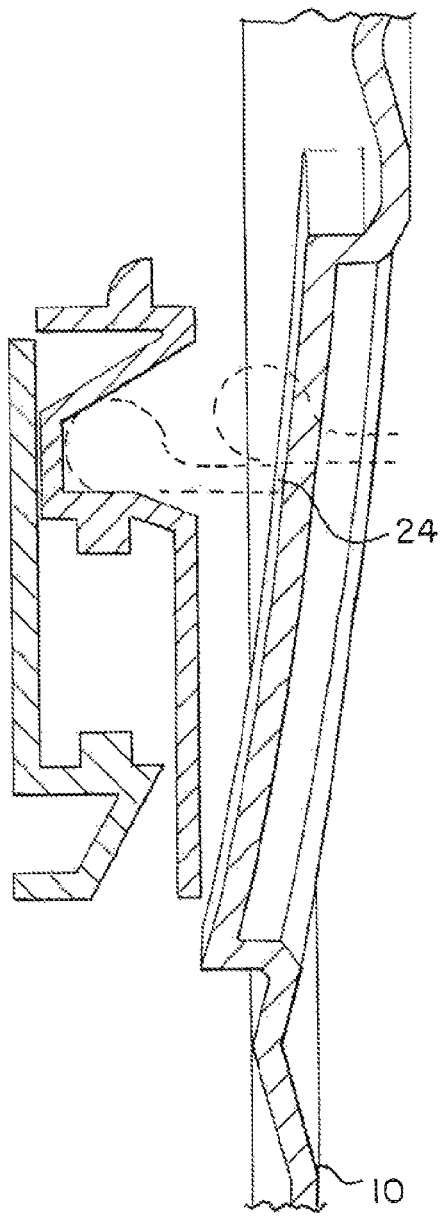
FIG. 4A is a cross section view of a support portion of a wheel cover mounted on a wheel hub in accordance with a preferred embodiment of the present invention.
Figure 4B:
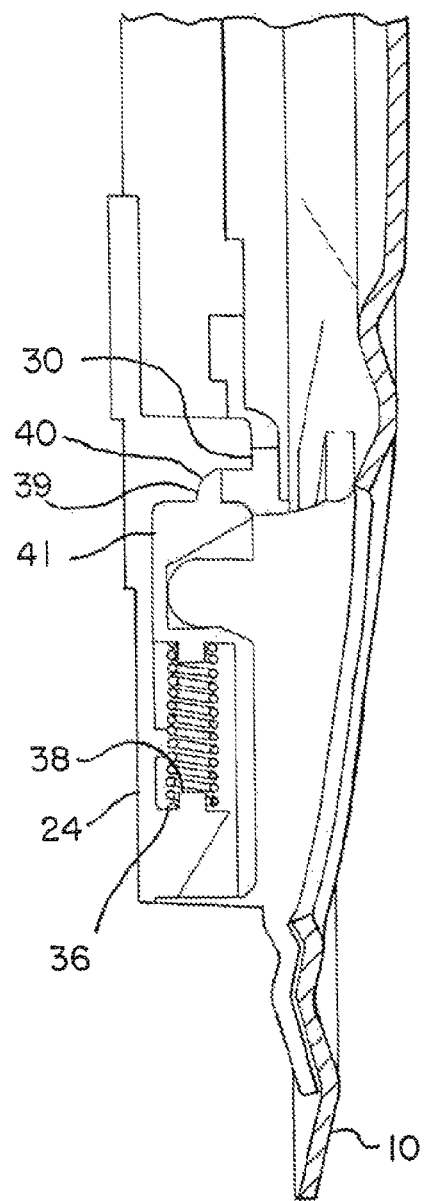
FIG. 4B is a detailed cross section view of a support portion of a wheel cover mounted on a wheel hub in accordance with a preferred embodiment of the present invention.

Referring now to FIGS. 4A and 4B, detailed partial cross sectional views of wheel cover 10 are shown with one ratchet assembly 24 shown. Ratchet assembly 24 is seen to comprise ratchet stop block 36, ratchet spring 38, ratchet operating holder 41 and ratchet extension 40. When press fit onto wheel 12 that includes support portion 30 of wheel cover 10 mounted onto wheel hub 20, ratchet extension 40 is forced by ratchet operating holder 41 and ratchet spring 38 into an engaging and supporting relationship with a radial edge surface 39 of support collar 30 of wheel cover 10. Support collar 30 would have already been installed on wheel hub 20 as shown in FIG. 3.

What is claimed is:

1. A wheel cover assembly comprising
a generally circular support collar affixed to a wheel hub of a wheel, the support collar having a radial edge,
a main section including an outer surface, an outer edge, and a latch assembly,
the latch assembly comprising a latch, a ratchet block, a ratchet operating holder, a ratchet spring and a ratchet extension,
the wheel cover ratchet extension engaging the radial edge of the support collar when the wheel cover is affixed to the wheel, wherein the support collar includes a pivot and clamp to allow the support collar to be affixed around the wheel hub.

2. The wheel cover of claim 1 wherein
the wheel cover is comprised of a structural plastic material.

3. The wheel cover of claim 1 wherein
the ratchet spring includes one end adjacent the ratchet block,
and the ratchet spring includes another end in engagement with a ratchet operating holder that acts against the ratchet extension.

4. The wheel cover of claim 3 wherein
the ratchet operating holder slides in a radial direction with respect to the wheel hub to push the ratchet extension into engagement with the radial edge of the support collar.

5. A wheel cover assembly comprising
a support collar affixed to a wheel hub of a wheel, the support collar having an outer radial edge,
a main section including an outer surface, a radial outer edge, and a latch assembly,
the latch assembly comprising a latch, a ratchet block, a ratchet operating holder, a ratchet spring and a ratchet extension,
the wheel cover ratchet extension engaging the radial edge of the support collar when the wheel cover is affixed to the wheel, wherein the support collar includes a pivot and clamp to allow the support collar to be affixed around the wheel hub.

6. The wheel cover of claim 5 wherein
the wheel cover is comprised of a structural plastic material.

7. The wheel cover of claim 5 wherein
the ratchet spring includes one end adjacent the ratchet block, and the ratchet spring includes another end in engagement with a ratchet operating holder that acts against the ratchet extension.

8. The wheel cover of claim 7 wherein
the ratchet operating holder slides in a radial direction with respect to the wheel hub to push the ratchet extension into engagement with the radial edge of the support collar.

9. The wheel cover of claim 5 wherein the latch comprises a portion of the outer surface of the wheel cover, and wherein the latch acts to compress the ratchet spring and thus to move the ratchet extension to allow installation of the wheel cover onto a wheel.

\* \* \* \* \*